United States Patent

[11] 3,604,794

| [72] | Inventor | Nicholas T. Simopoulos<br>Dayton, Ohio |
|---|---|---|
| [21] | Appl. No. | 806,471 |
| [22] | Filed | Mar. 12, 1969 |
| [45] | Patented | Sept. 14, 1971 |
| [73] | Assignee | Labtron Corporation of America<br>Dayton, Ohio |

[54] MICROFILM VIEWER
8 Claims 15 Drawing Figs

[52] U.S. Cl. .......................................................... 353/61
[51] Int. Cl. ................................................... G03b 21/16
[50] Field of Search ........................................... 353/57, 60,
61, 87, 78, 77, 27, 100, 101, 71.72, 73, 74, 76

[56] References Cited
UNITED STATES PATENTS

| 2,070,226 | 2/1937 | Erwood | 353/72 X |
| 2,227,071 | 12/1940 | Dilks | 353/72 X |
| 2,288,345 | 6/1942 | De Vry et al. | 353/61 X |
| 2,304,921 | 12/1942 | Hopkins | 353/77 X |
| 2,431,662 | 11/1947 | Ralph | 353/27 |
| 2,878,718 | 3/1959 | Post | 353/87 X |
| 3,131,303 | 4/1964 | Chitayat | 353/122 X |
| 3,369,450 | 2/1968 | Peters | 353/27 |
| 3,472,588 | 10/1969 | Dine et al. | 353/78 X |

*Primary Examiner*—Harry N. Haroian
*Attorney*—Marechal, Biebel, French & Bugg

ABSTRACT: A microfilm projector incorporates a panel which supports a vertical film holder rotatable through 360° and movable both vertically and horizontally for scanning large transparencies and orienting an image on a screen. Selectable lenses are supported by the panel rearwardly of the film holder, and a lamp box is supported in front of the film holder by a ductlike arm pivotally mounted on the panel to provide convenient access to the film holder as well as convenient interchangement of the film holder with a continuous film system. The lamp box is cooled by blowing air through the arm from a blower supported by the panel within a cabinet which may support a back-lighted viewing screen or have a transparent wall for projecting onto a remote viewing screen.

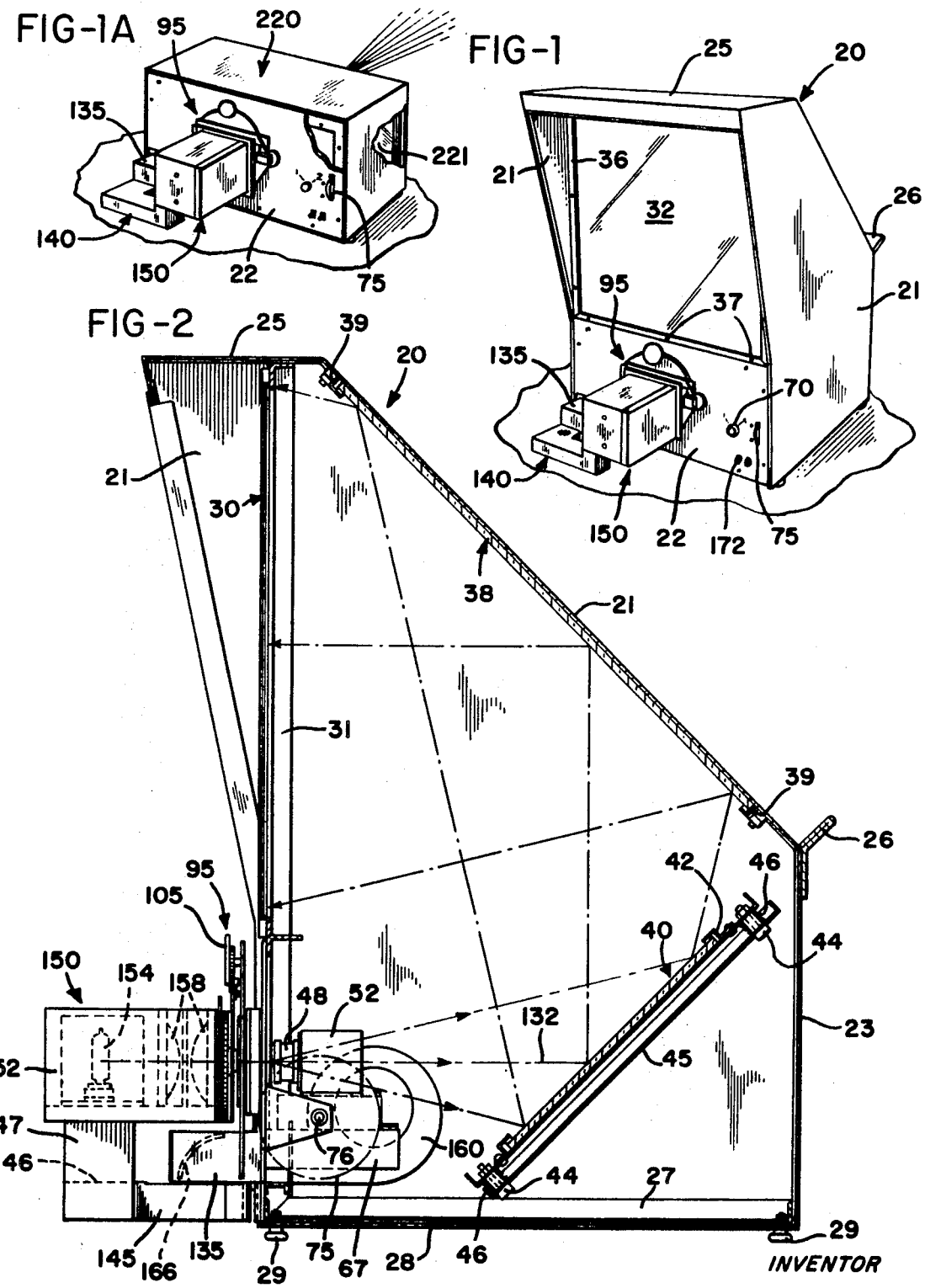

FIG-3
FIG-4
FIG-5
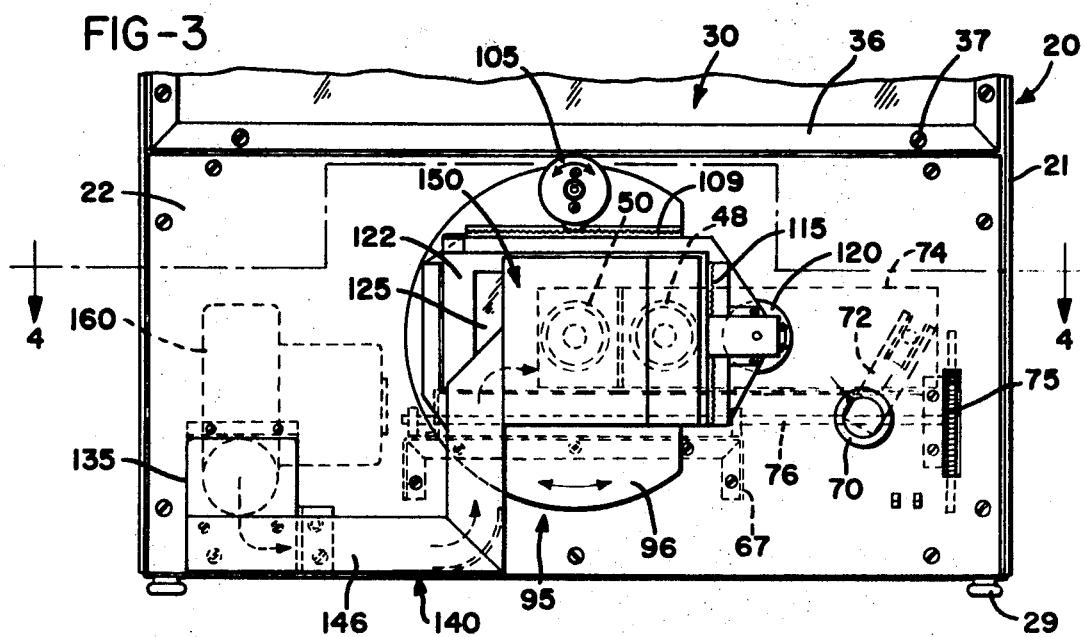
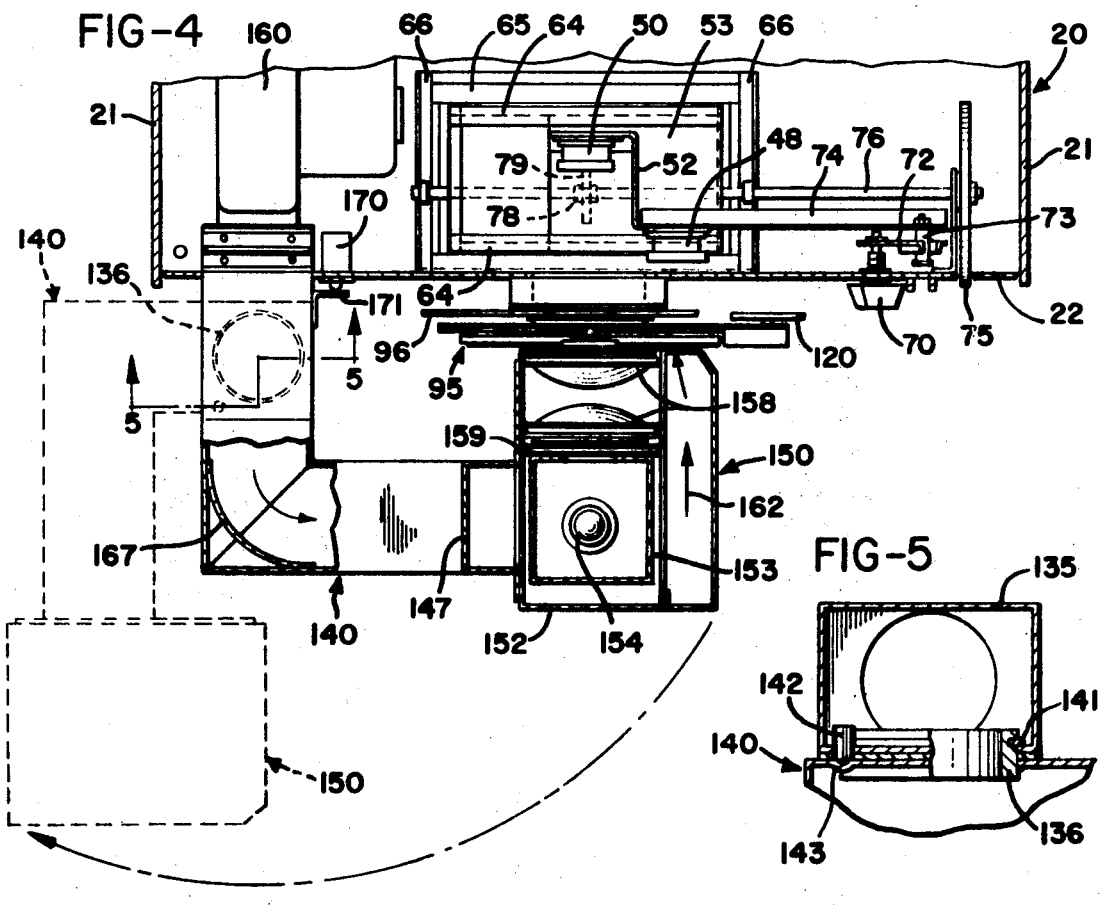

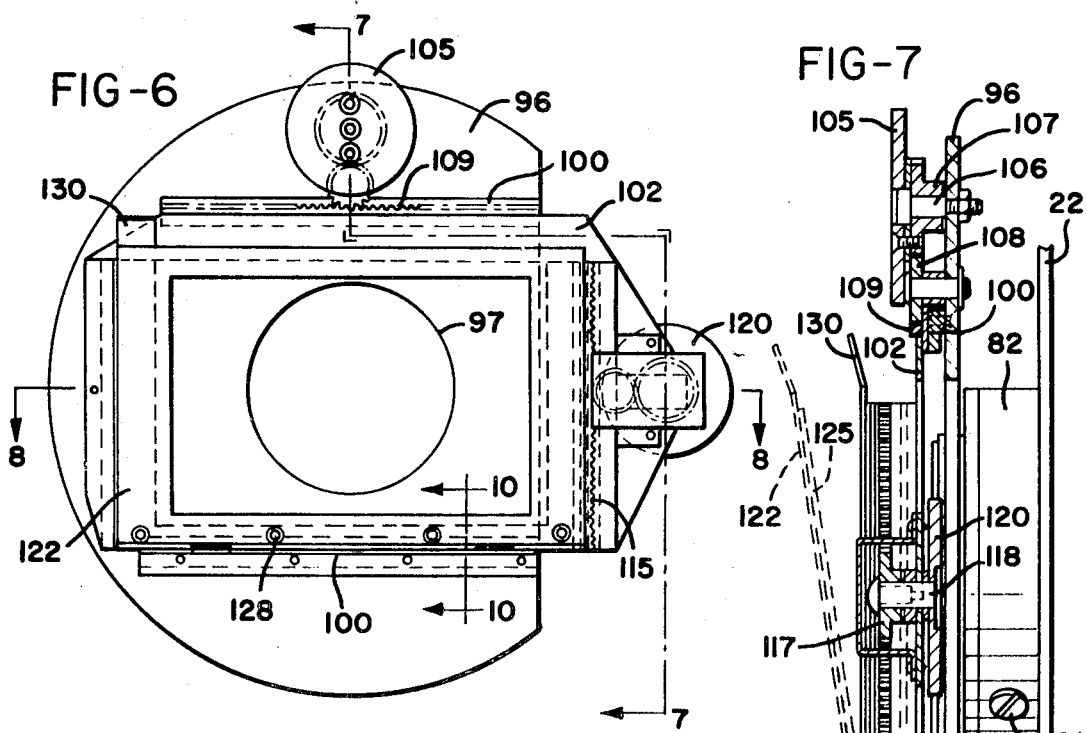
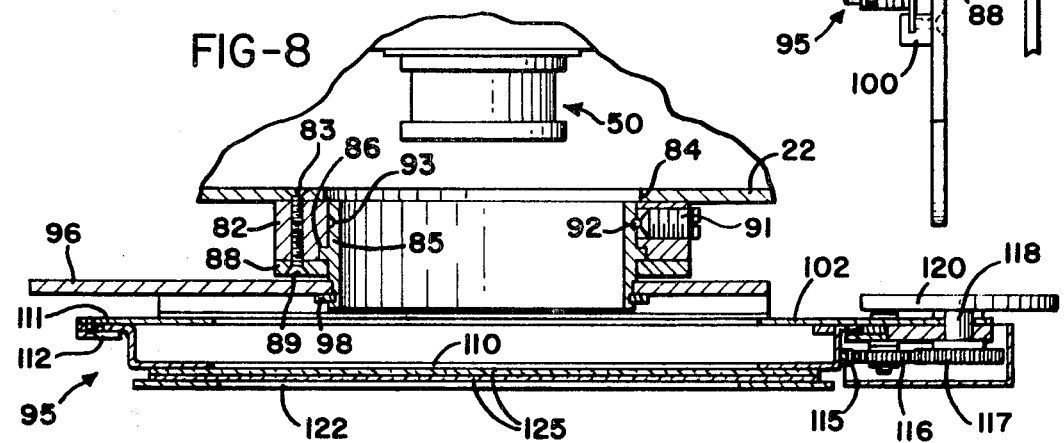
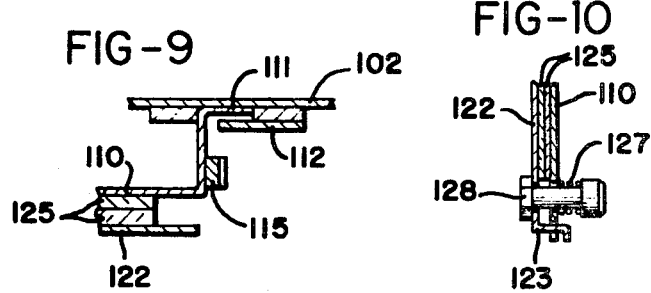
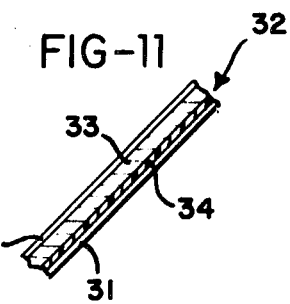

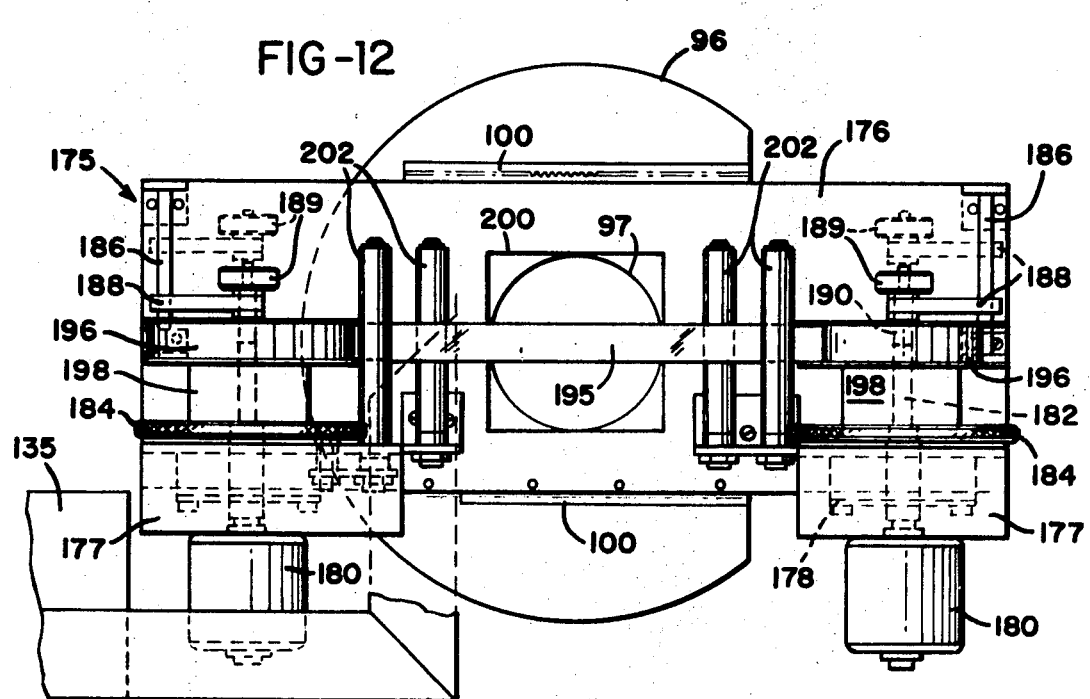
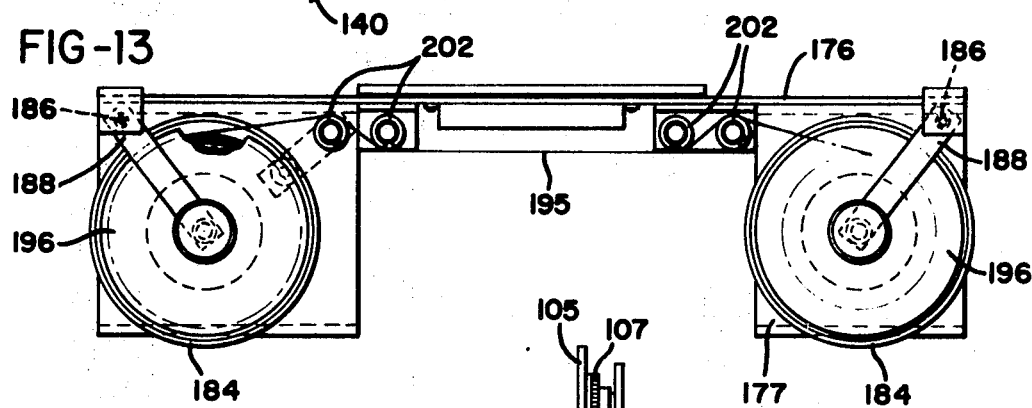
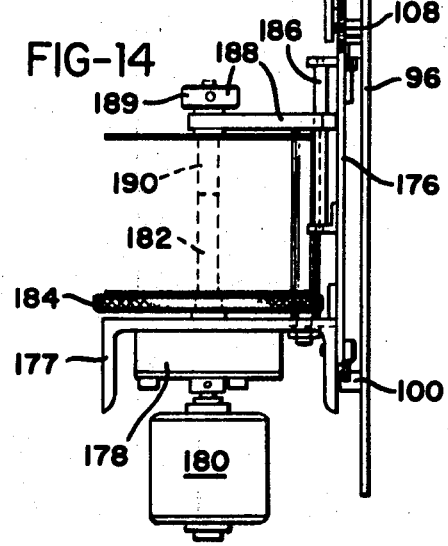

MICROFILM VIEWER

BACKGROUND OF THE INVENTION

In a microfilm reader or viewer, commonly each microfiche, film card or 105mm. film is placed within a film holder, and the image of a selected transparency or frame is projected by reflection onto a back lighted viewing screen. It is desirable to support the film holder for X-Y movement as well as 360° rotation to provide for scanning multiple-image transparencies and for centering and orienting each selected image. It is also desirable for the film holder to be positioned generally vertically so that the orientation of each film card does not have to be changed while it is being loaded into the film holder from a storage tray or other container. This assures that the film card will not be inadvertently inverted and/or reversed before it is returned to the storage tray. Furthermore, it is important to have the film holder easily accessible to provide for conveniently loading and unloading of each film card as well as convenient access to the glass film-card-clamping plates for cleaning. Another desirable feature for a microfilm viewer is that it be capable of handling microfiche cards, aperture cards and 105mm. film as well as continuous microfilm on a reel.

SUMMARY OF THE INVENTION

The present invention is directed to an improved microfilm-projecting apparatus which provides all of the desirable features mentioned above and, in addition, provides for projecting images onto a remote-viewing screen. In accordance with one embodiment of the invention, a microfilm viewer includes a cabinet which supports a vertical back-lighted-viewing screen formed by laminating a translucent frosted sheet of flexible vinyl film onto a clear glass plate. A front panel supports a vertical film holder directly below the viewing screen, and the film holder includes a pair of relatively movable glass-clamping plates which are supported for both vertical and horizontal movement as well as 360° rotation.

A light box is positioned directly in front of the film holder and is supported by a ductlike arm through which air is forced from a blower positioned within the cabinet for cooling a projector lamp within the box. The light box is movable between an operative position adjacent the film holder and a retracted position by pivoting the arm and thereby provides for conveniently interchanging the film-card holder with a continuous microfilm-reel system. Selectable lenses are adjustably supported within the cabinet by the front panel directly behind the film holder and cooperate with a pair of angularly arranged first surface mirrors for reflecting properly inverted images onto the viewing screen. The front panel and the components supported thereby may also be mounted on a cabinet having a transparent rear wall for projecting images onto a remote surface such as a movie projector screen.

BRIEF DESCRIPTION OF THE DRAWINGS

FIG. 1 is a perspective view of a microfilm reader or viewer constructed in accordance with the invention;

FIG. 1A is a perspective view of a microfilm projector constructed in accordance with the invention;

FIG. 2 is a side view of the viewer shown in FIG. 1 with the cabinet shown in section;

FIG. 3 is a front view of the lower portion of the viewer shown in FIGS. 1 and 2;

FIG. 4 is a fragmentary section taken generally on the line 4—4 of FIG. 3;

FIG. 5 is a fragmentary section taken generally on the line 5—5 of FIG. 4;

FIG. 6 is an enlarged front view of the film holder;

FIG. 7 is a section taken generally on the line 7—7 of FIG. 6;

FIG. 8 is a fragmentary section taken generally on the line 8—8 of FIG. 6;

FIG. 9 is an enlarged fragmentary section of a portion of the film holder shown in FIG. 8;

FIG. 10 is an enlarged fragmentary section taken generally on the line 10—10 of FIG. 6;

FIG. 11 is a fragmentary section of the viewing screen shown in FIGS. 1 and 2;

FIG. 12 is a view similar to FIG. 3, showing a continuous microfilm reel attachment or system in place of the film card holder;

FIG. 13 is a plan view of the reel system shown in FIG. 12; and

FIG. 14 is an end view of the reel system shown in FIGS. 12 and 13.

DESCRIPTION OF THE PREFERRED EMBODIMENTS

Referring to the drawings, FIGS. 1 and 2 show a microfilm viewer for microfiche cards and includes a cabinet 20 formed by parallel spaced vertical side panels or walls 21 connected by a front wall or panel 22, a lower rear wall 23, a sloping upper rear wall 24 and a top wall 25. The rear wall 24 slopes on an angle of approximately 45°, and a laterally extending flange 26 is secured to the upper edge portion of the rear wall 23 so that the cabinet may be used as a lectern with a book or notes supported by the upper rear wall 24 and flange 26. A rectangular frame 27 extends around the base of the cabinet 20 and is covered by bottom wall 28. A set of corner legs or feet 29 are secured to the frame 27.

A vertically extending rectangular frame 31 is rigidly connected to the base frame 27, and the front panel 22 is removable secured to the frame 31 by a series of screws. A vertical viewing screen 32 is supported by the frame 31 directly above the front panel 22 and under the top wall 25 which shades the screen and prevents reflections of overhead light sources. Referring to FIG. 11, preferably the viewing screen 32 consists of a sheet of clear plate glass 33 on which is laminated a translucent frosted sheet of flexible vinyl film 34 having a thickness of approximately 0.008 inch. The screen 32 is retained by a generally square frame 36 which is secured to the frame 31 by a series of screws 37.

A first surface mirror 38 is secured to the underneath surface of the upper rear wall 24 by a series or corner clamps 39 so that it is positioned on an angle of 45° in relation to the viewing screen 30. Another first surface mirror 40 is supported below the mirror 38 by a frame 42 which is mounted on a series of corner bolts 44 secured to a laterally extending panel 45 rigidly connecting the sidewalls 21. A series of compression springs 46 are mounted on the bolts 44 and cooperate with nuts on the bolts to provide for fine adjustment of the mirror 40 relative to the mirror 38 and the viewing screen 32.

Referring to FIGS. 2 and 4, a set of lenses 48 or 50 are mounted on a bracket 52 having a bottom plate 53 which is slidably received within a pair of parallel-spaced laterally extending guideways 64. A plate 65 supports the guideways 64 and has edge portions slidably received within a pair of parallel-spaced guideways 66 mounted on a bracket 67 (FIG. 2) secured to the front panel 22. The guideways 64 provide for selecting one of the lenses 48 and 50 according to the magnification ratio desired by rotating a knob 70 connected to a crank arm 72 which receives a pin 73 projecting forwardly from an arm 74 connected to the bracket 52.

Preferably, the lens 50 provides approximately 10X magnification and the lens 48 provides approximately 20X magnification. The guideways 66 provide for focusing the selected lens 48 or 50 by rotation of a knurled wheel 75 which projects through the front panel 22. The wheel 75 is mounted on one end of a laterally extending shaft 76, and a pinion 78 is mounted on the other end of the shaft 76 for engaging a rack 79 secured to the underneath surface of the plate 65. Instead of employing two alternately selectable lenses 48 and 50, it is within the scope of the invention to shift a secondary lens into alignment with a primary lens when it is desirable to increase the magnification ratio.

An annular bearing 82 (FIG. 8) is secured to the front panel 22 by a series of screws 83 and surrounds a circular opening 84 within the front panel. The bearing 82 supports a rotatable tube 85 having a peripheral flange 86 which is engaged by an annular retaining plate 88 secured to the bearing 82 by a series of screws 89. A detent screw 91 (FIG. 8) is threaded radially into the bearing 82 and carries a spring-loaded ball 92 which selectively engages a series of small cavities 93 formed within the outer surface of the tube 85 when the tube 85 is rotated and thereby locates the tube at predetermined positions.

A vertical film holder 95 (FIGS. 6–8) is positioned directly in front of the front panel 22 and includes a disk 96 having a circular center opening 97 which receives the forward end portion of the tube 85. A retaining ring 98 secures the disk 96 to the tube 85 which is also keyed to the disk. A pair of vertically spaced horizontal tracks 100 are secured to the disk 96 and support a framelike plate 102. A wheel or knob 105 (FIGS. 6 and 7) is rotatably supported by a screw 106 secured to the disk 96 and is connected by a gear 107 to a gear 108 which engages a horizontally extending rack 109 secured to the upper portion of the plate 102.

Referring to FIGS. 8 and 9, a rectangular frame 110 has oppositely projecting flange portions 111 which are slidably received within laterally spaced vertically extending tracks 112 secured to the edge portions of the frame 102. A vertically extending rack 115 is secured to the right flange portion 111 and is engaged by a pinion 116 (FIG. 8) which meshes with a gear 117 mounted on a shaft 118 connected to a dial or knob 120. A rectangular frame 122 (FIGS. 6, 9 and 10) has a lower portion which is hinged to the frame 110 by a pair of angle tabs 123. A pair of clear glass plates 125 are attached to the frames 110 and 122 and are urged together by a pair of compression springs 127 mounted on a corresponding pair of bolts 128 extending through holes within the lower portions of the frames 110 and 122.

A tab 130 (FIGS. 6 and 7) projects upwardly from the upper left corner of the frame 122 and is adapted to be engaged by a finger to tilt the frame 122 and the corresponding glass plate 125 forwardly to the dotted position shown in FIG. 7 for inserting a microfiche card between the glass plates 125 which hold the card flat. The X–Y adjustment provided by rotating the knobs 105 and 120 and the rotation of the disk 96 enable each transparency or frame on a microfiche card or a selected group of frames to be precisely positioned and oriented in relation to the optical path 132 (FIG. 2) of the selected lens 48 or 50.

A tubular duct 135 (FIGS. 2, 4 and 5) of rectangular cross section projects forwardly from the front wall or panel 22 and has a circular opening within its bottom wall for receiving a tubular bearing 136 which is rigidly secured to a ductlike arm 140. A retaining ring 141 secures the bearing 136 to the duct 135, and a spring-loaded detent plunger 142 is mounted on the duct 135 for selectively engaging a plurality of small cavities 143 formed within the adjacent portion of the arm 140.

Referring to FIGS. 2 and 4, the arm 140 includes a forwardly projecting duct portion 145 (FIG. 2) which connects to a laterally extending duct portion 146 (FIG. 4) connected to a vertical duct portion 147. A light box 150 is secured to the upper end of the duct portion 147 of the arm 140 and includes a boxlike housing 152 which encloses a perforated shield 153 surrounding a light source or projector lamp 154. A circular opening is formed within the required wall of the shield 153, and a pair of condenser lenses 158 are mounted on the housing 152 aligned with the opening 156 and the optical axis 132 of the lens 50. A heat-reflecting, light-transmitting plate 159 is positioned between the shield 153 and the adjacent lens 158.

A blower 160 (FIGS. 3 and 4) is mounted on the front panel 22 and is positioned to discharge air forwardly through the duct 135 and the arm 140 for cooling the housing 152. The cooling air flows around and through the shield 153, then rearwardly within the housing 152 in the direction of the arrows 162 and is deflected by an inclined wall 164 for discharge across the face of the forward glass plate 125. A curved deflector 166 (FIG. 2) is positioned within the forward end of the duct 135, and a similar curved deflector 167 (FIG. 4) is positioned at the junction of the arm portions 145 and 146 to produce a smooth flow of air through the arm 140.

Referring to FIG. 4, the arm 140 is pivotable to move the light box 150 between an operative position where the lenses 158 are aligned with the aperture 97 within the disk 96 and a retracted position as shown by the dotted lines. A switch 170 (FIG. 4) is mounted on the lower end portion of the front wall 22 and is actuated by a tab 171 secured to the portion 145 of the arm 140. The switch 170 is connected in series with the lamp 154 and operates to deenergize the lamp when the light box 150 is moved to its retracted position. The blower 160, however, is controlled by a separate switch 172 and continues to operate even when the light box 150 is moved to its retracted position to dissipate heat from the lamp housing 152 even after the lamp 154 is deenergized.

The microfilm viewer of the invention is also adapted to receive a continuous microfilm reel system. Referring to FIGS. 12–14, the microfilm card holder 95 is removed from the rotatable disk 96 by sliding the frame 102 horizontally from the tracks 100 after the light box 150 is retracted. In place of the film holder 95, a microfilm holder or reel system 175 is attached to the disk 96 by sliding a baseplate 176 horizontally into the tracks 100. A channel member 177 is secured to each lower corner of the baseplate 176, and each channel member 177 supports a bearing holder 178 and a corresponding reversible electric motor 180. A vertical spindle 182 extends upwardly from each bearing holder 178 and is driven by the corresponding motor 180. A knurled disk 184 is secured to the lower end portion of each spindle 182 for manually rotating the spindle.

A vertically extending guide rod 186 is secured to each upper corner of the baseplate 176 and slidably supports an arm 188 which carries a knob 189 secured to the upper end of a vertical spindle extension 190. The microfilm reel system 195 is adapted to accommodate microfilm of various widths, as for example 16mm. and 35mm. film. For purposes of illustration, a 16mm. film 195 is shown in FIGS. 12 and 13, and accordingly, a pair of annular spacer blocks 198 are mounted on the spindle 182 for positioning the film reels 196 so that the film 195 is centered in relation to the optical axis 132 of the lenses 50 and 158. The corresponding spindle extensions 190 are lowered to retain the reels 196 on the spindles 182 and spacer blocks 198.

The film 195 is directed across the center of a square opening 200 (FIG. 12) within the plate 176 by a pair of vertical rollers 202 positioned adjacent each side of the opening 200. One of the rollers 202 is supported for floating movement under a spring-bias to maintain a substantially constant tension within the film. The motors 180 are connected by an electrical control circuit (not shown) which provides for alternately reversing each motor and for alternately unwinding and rewinding the film 195 on the reels 196.

Referring to FIG. 1A, since the film holder 95, the light box 150, the blower 160 and the lens system are all supported by the front panel 22, it is within the scope of the invention to form a microfilm projector by mounting the front panel 22 on a rectangular cabinet 220 having a transparent rear wall preferably formed by a clear glass plate 221. The cabinet 220 permits the image to be projected onto a remote viewing surface such as a wall or a movie-projecting screen.

From the drawings and the above description, it is apparent that microfilm projecting apparatus constructed in accordance with the invention provides several desirable features and advantages. For example, the film holder 95 is positioned in a vertical plane adjacent the front panel 22, and the glass frames 110 and 122 are movable in X–Y directions in addition to 360° rotation so that a series of microfilm cards can be conveniently and quickly inserted and removed between the glass plates 125, and each image of each transparency or frame can be easily and quickly oriented and positioned on the screen 30.

Another important feature is provided by the interchangement of the film holder 95 and the reel system 175. That is, by simply moving the light box to its retracted position, either the film holder 95 or the film-reel system 175 may be mounted on the disk 96 so that selected frames on either microfilm cards or continuous microfilm can be viewed on the screen 30 or on a remote screen. Furthermore, the reel system 175 will accommodate various film widths simply by interchanging the annular spacer blocks 198 which center each film relative to the optical axis 132.

The pivotable arm 140 which supports the light box 150 also provides an important advantage. That is, the arm 140 not only serves as a duct for directing cooling air to the light box 150 but also provides for moving the light box to a retracted position to facilitate interchangement between the microfilm holder 95 and the microfilm reel system 175. Furthermore, when the light box 150 is retracted, the iris of either lens 48 or 50 can be easily adjusted simply by inserting the fingers through the apertures 97 within the disk 96.

The viewing screen 30 including the translucent frosted vinyl film 34 laminated to the clear glass plate 33 provides a highly effective viewing screen of economical construction. Moreover, the sloping upper rear wall 24 of the cabinet 20 and the flange 26 enable the cabinet 20 to be used as a lectern while one or more images are being viewed on the screen 30. That is, by providing movable remote controls for the reversible motors 180, a person presenting a lecture can conveniently refer to visual aids provided by projecting images onto the viewing screen 30 from the continuous microfilm 195.

The subassembly of the front panel 22 and the components supported thereby provides another important feature of the invention. That is, the panel 22 may be mounted on either the cabinet 20 or the cabinet 220 to provide either a combined projector-viewer or only a projector adapted for use with a remote viewing screen. It is also within the scope of the invention to insert the clear glass plate 221 within the rear wall 23 of the cabinet 20 and to support the mirror 40 for retracted movement to a horizontal position whereby the cabinet 20 could also serve as a projector cabinet.

While the forms of apparatus herein described constitute preferred embodiments of the invention, it is to be understood that the invention is not limited to these precise forms of apparatus, and that changes may be made therein without departing from the scope and spirit of the invention.

What is claimed is:

1. Improved microfilm projecting apparatus comprising a cabinet having a front wall, a film holder positioned adjacent said front wall, means mounted on said wall supporting said film holder for movement generally parallel to said wall, a light box positioned forwardly of said film holder and including a light source disposed to direct light rearwardly through film supported by said holder, a tubular arm pivotally connected to said cabinet and supporting said light box for movement between a position adjacent said film holder and a retracted position, means including a lens for projecting an enlarged image of a transparency on the film, and blower means located within said cabinet for directing a flow of air through said arm for cooling said light box.

2. Apparatus as defined in claim 1, including a generally vertical viewing screen mounted on said cabinet above both said film holder and said light box, means within said cabinet for reflecting the image onto said screen, and said arm being pivotally connected to said front wall of said cabinet below said screen.

3. Apparatus as defined in claim 1 wherein said film holder includes a pair of parallel-spaced spindles extending substantially parallel to said front wall, and said film holder is supported for rotation on a generally horizontal axis.

4. Apparatus as defined in claim 1 wherein said supporting means for said film holder include a generally vertical frame member rotatable through 360° and movable linearly in substantially vertical and horizontal directions.

5. Apparatus as defined in claim 1 including an interlock switch connected to control said light source, and means for actuating said switch in response to movement of said arm supporting said light box.

6. Apparatus as defined in claim 1 wherein said front wall comprises a removable panel, and said supporting means for said film holder and said light box are secured to said panel for removal therewith.

7. Improved microfilm projecting apparatus comprising a cabinet, a film holder, a light box including a light source positioned to direct light through film supported by said holder, an adjustable tubular arm supporting said light box for predetermined movement, blower means positioned within said cabinet for directing a flow of air through said arm for cooling said light box, and means including a lens for projecting an enlarged image of a transparency on the film.

8. Improved microfilm projecting apparatus comprising a cabinet having a front wall, a film holder positioned adjacent said front wall, means mounted on said front wall and supporting said film holder for 360° rotation on a substantially horizontal axis and for linear movement within a generally vertical plane, a light box positioned forwardly of said film holder and including a light source disposed to direct light rearwardly through film supported by said holder, adjustable duct means extending from said cabinet and supporting said light box adjacent said film holder, means including a lens for projecting an enlarged image of a transparency on the film, and blower means positioned within said cabinet for directing a flow of air through said duct means for cooling said light box.